US008428660B2

United States Patent
Lewis

(10) Patent No.: US 8,428,660 B2
(45) Date of Patent: *Apr. 23, 2013

(54) SHARING AT LEAST ONE FUNCTIONAL BLOCK IN A COMMUNICATION SYSTEM

(75) Inventor: Michael Lewis, Maersta (SE)

(73) Assignee: Infineon Technologies AG, Neubiberg (DE)

( * ) Notice: Subject to any disclaimer, the term of this patent is extended or adjusted under 35 U.S.C. 154(b) by 227 days.

This patent is subject to a terminal disclaimer.

(21) Appl. No.: 12/782,562

(22) Filed: May 18, 2010

(65) Prior Publication Data

US 2010/0227652 A1    Sep. 9, 2010

Related U.S. Application Data

(63) Continuation of application No. 11/470,734, filed on Sep. 7, 2006, now Pat. No. 7,756,551.

(30) Foreign Application Priority Data

Sep. 8, 2005    (EP) ..................................... 05019568

(51) Int. Cl.
*H04M 1/00*    (2006.01)

(52) U.S. Cl.
USPC ........................................ 455/569.1; 455/433

(58) Field of Classification Search ............... 455/569.1, 455/433, 114.1, 67.11–67.14, 63.1–63.4
See application file for complete search history.

(56) References Cited

U.S. PATENT DOCUMENTS

2004/0204168 A1* 10/2004 Laurila ....................... 455/569.1

FOREIGN PATENT DOCUMENTS

GB    2358990 A  *  8/2001

OTHER PUBLICATIONS

Prosecution History from U.S. Appl. No. 11/470,734, filed Sep. 7, 2006, to include: May 14, 2010 List of References considered by examiner; Jan. 22, 2010 Advisory Action (PTOL-303) Jan. 13, 2010; Advisory Action (PTOL-303) Sep. 24, 2009; Final Rejection Mar. 20, 2009; Non-Final Rejection Mar. 20, 2009; List of references Mar. 20, 2009; and List of References considered by examiner.

* cited by examiner

*Primary Examiner* — Lana N Le
(74) *Attorney, Agent, or Firm* — SpryIP, LLC

(57) ABSTRACT

A communication system has an audio receiver path, and a digital transceiver path, wherein both paths are integrated on a single integrated circuit. The audio receiver path has a concealment device, and the communication system also has at least one functional block connected to and shared by the both paths. The communication system has a digital controller connected to both paths, the at least one functional block, and the concealment device. The digital controller is operable to schedule the operation of the digital transceiver path, and to inform the concealment device of start and end points of the activity of the digital transceiver path. The concealment device is operable to mask interruptions in the audio stream from the audio receiver path caused during periods of activity of the digital transceiver path.

11 Claims, 4 Drawing Sheets

FIG 4
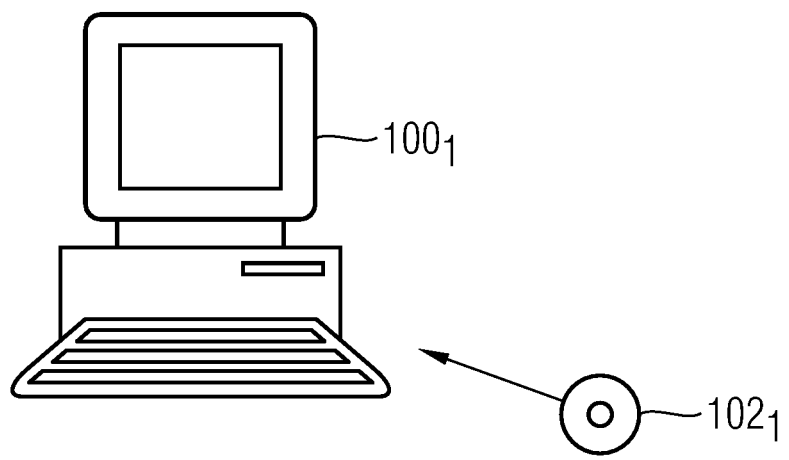
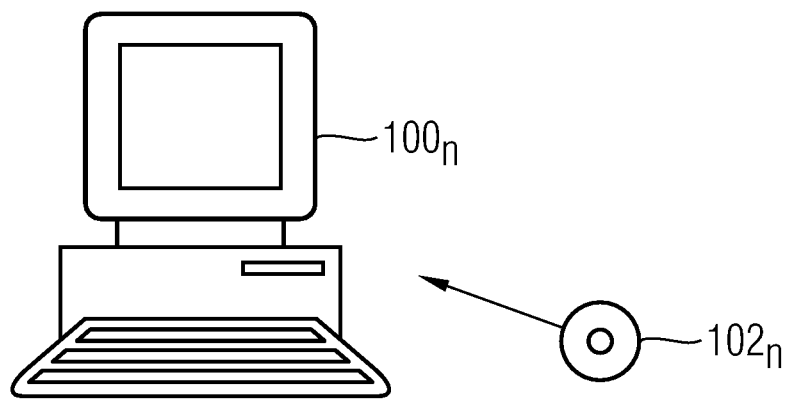

SHARING AT LEAST ONE FUNCTIONAL BLOCK IN A COMMUNICATION SYSTEM

PRIORITY

This Application is a continuation of patent application Ser. No. 11/470,734, which was filed on Sep. 7, 2006 and which claims priority from European Patent Application No. EP 05 019 568.4, which was filed on Sep. 8, 2005. The entire contents of the patent application Ser. No. 11/470,734 and the European Patent Application No. EP 05 019 568.4 are hereby incorporated herein by reference.

BACKGROUND

It is becoming increasingly common for mobile phones and related accessories (e.g. headsets) to include a broadcast FM radio receiver so that the user can listen to e.g. music stations. It is also becoming very common for mobile phones and accessories to include Bluetooth® wireless data transceivers. Since both technologies are reaching high market penetration, it becomes economically sensible to integrate both functions in a single integrated circuit.

When integrating some functions of a communication system in a single integrated circuit, the idea of sharing some components may arise. Such sharing of components is desirable since it reduces the total size and the cost of the integrated circuit. However, it is then not possible to operate e.g. both the FM receiver and the Bluetooth® transceiver simultaneously.

A typical operating condition for a Bluetooth® transceiver is to be in a "semi-idle" state where a link is maintained with its peers but little active transfer of data is performed. Such a situation is encountered when a link is established between a mobile phone and a Bluetooth® headset. In this situation, the duty cycle (on-to-off ratio) of the Bluetooth® device is low, with data transfer durations in the order of a millisecond. It is typically in such a state that a user may wish to listen to the FM audio broadcasts, e.g. in the Bluetooth®-enabled headset.

SUMMARY

In a first aspect, a communication system may comprise an audio receiver path and a digital transceiver path, wherein both paths are integrated on a single integrated circuit. The audio receiver path may comprise a concealment means, and the communication system also may comprise at least one functional block connected to and shared by the both paths. The communication system also may comprise a digital controller means connected to the both paths, the at least one functional block, and the concealment means. The digital controller means can be operable to schedule the operation of the digital transceiver path, and to inform the concealment means of start and end points of the activity of the digital transceiver path. The concealment means can be operable to mask interruptions in the audio stream from the audio receiver path caused during periods of activity of the digital transceiver path. With this communication system it may be possible to operate the both paths simultaneously from the point of view of the user, reducing the cost of implementation without significantly degrading the audio quality.

Embodiments of the invention will now be described with a reference to the accompanying drawings, in which:

BRIEF DESCRIPTION OF THE DRAWINGS

FIG. 4 shows a schematic diagram of some computer program products.

DETAILED DESCRIPTION

Figure 1:
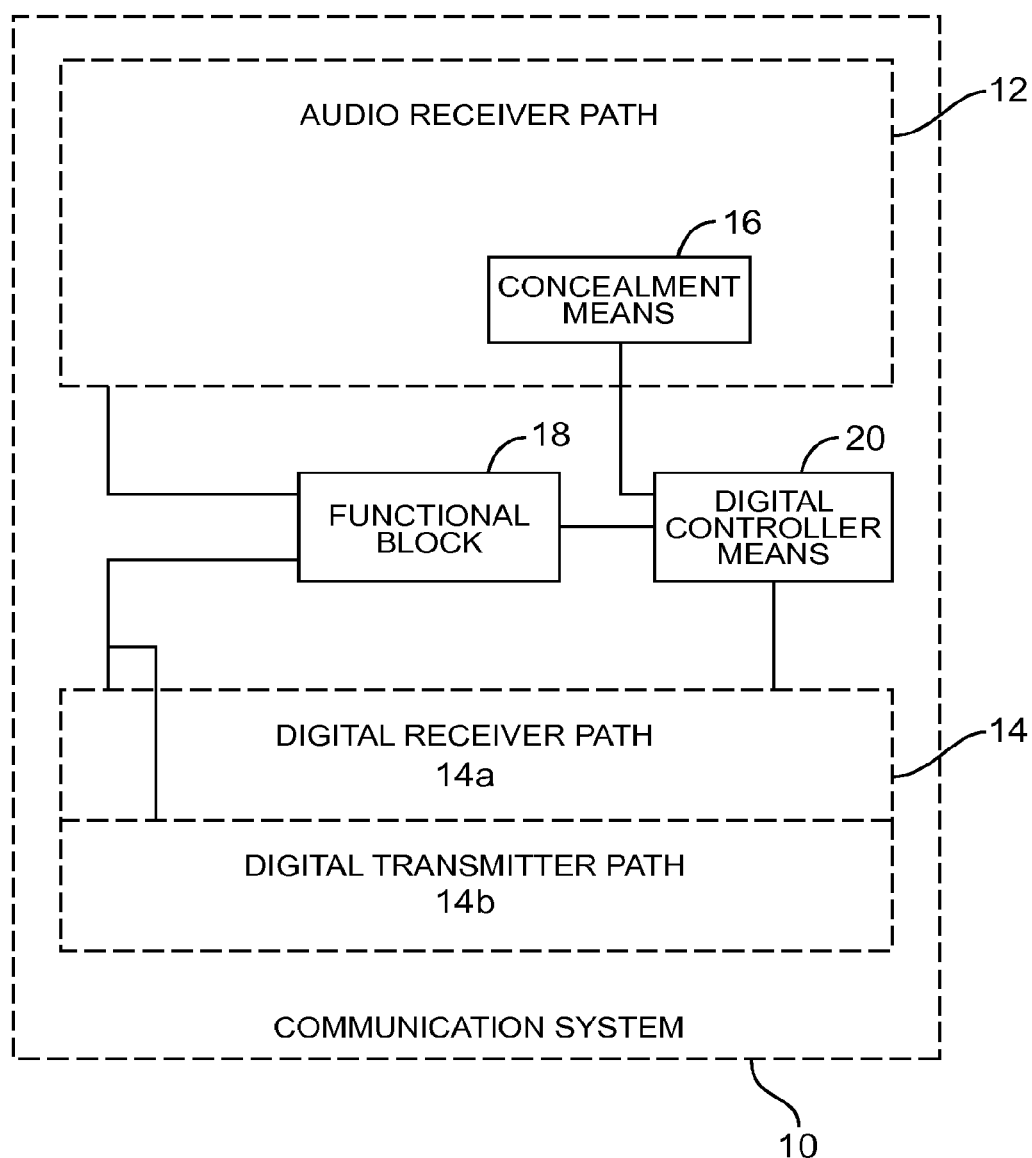
FIG. 1 is a block diagram of a communication system.

A further advantage in this context may be achieved if said digital controller means also is operable to control the operation mode of said at least one functional block in dependence of which of said both paths is active.

Furthermore, it can be an advantage in this context if said concealment means masks said interruptions in the audio stream by storing previously received audio data, and to create an estimate of a missing section of said audio stream during said interruptions by using said stored audio data. A further advantage in this context may be achieved if said concealment means makes use of compressed audio data.

Furthermore, it can be an advantage in this context if said audio receiver path is an FM audio receiver path. A further advantage in this context may be achieved if said FM audio receiver path comprises an antenna means, a to said antenna means connected low noise amplifier means, a to said low noise amplifier means connected mixer means also connected to said at least one functional block, an to said mixer means connected intermediate frequency means, a to said intermediate frequency means connected analog-digital converter means, a to said analog-digital converter means connected detector means which in turn is connected to said concealment means, and a to said concealment means connected loudspeakers means.

Furthermore, it can be an advantage in this context if said digital transceiver path is a transceiver path using low power, and compromises a digital receiver path and a digital transmitter path.

A further advantage in this context may be achieved if said digital receiver path comprises an antenna means, a to said antenna means connected low noise amplifier means, a to said low noise amplifier means connected first mixer means, also connected to said at least one functional block, an to said first mixer means connected intermediate frequency means, a to said intermediate frequency means connected analog-digital converter means, a to said analog-digital converter means connected demodulator means which in turn is connected to said digital controller means.

Furthermore, it can be an advantage in this context if said digital transmitter path comprises a power amplifier means connected to said antenna means, a to said power amplifier means connected second mixer means also connected to said at least one functional block, an to said second mixer means connected digital-analog converter means, and a to said digital-analog converter means connected modulator means which in turn is connected to said digital controller means.

A further advantage in this context may be achieved if said at least one functional block is a voltage controlled oscillator means, which is operable to generate a local oscillator frequency.

Another object is to provide a method of sharing at least one functional block in a communication system comprising an audio receiver path and a digital transceiver path. Both paths are integrated on a single integrated circuit. The method may comprise the following steps:

with the aid of the digital controller means, to schedule the operation of said digital transceiver path;
with the aid of said digital controller means, to configure said at least one functional block to the appropriate mode of operation;

with the aid of said digital controller means, to inform a concealment function comprised in said audio receiver path of start and end points of the activity of said digital transceiver path; and with the aid of said concealment functional, to mask interruptions in the audio stream from said audio receiver path caused during periods of activity of said digital transceiver path.

An advantage with this method is that it may be possible to operate the both paths simultaneously from the point of view of the user, reducing the cost of implementation without significantly degrading the audio quality.

A further advantage in this context may be achieved if said method also comprises the steps:

with the aid of said concealment function, to store previously received audio data; and to create an estimate of a missing section of said audio stream during said interruptions by using said stored audio data.

Furthermore, it can be an advantage in this context if said concealment function makes use of compressed audio data.

A further advantage in this context may be achieved if said audio receiver path is an FM audio receiver path. Furthermore, it can be an advantage in this context if said digital transceiver path is a transceiver path using low power, and comprises a digital receiver path, and a digital transmitter path.

A further advantage in this context may be achieved if said at least one functional block is a voltage controlled oscillator means and the method also comprises the step:

to generate a local oscillator frequency.

Another object is to provide at least one computer program product for sharing at least one functional block in a communication system. The at least one computer program product is/are directly loadable into the internal memory of at least one digital computer. The at least one computer program product comprises software code portions for performing the steps of the method. An advantage with this at least one computer program product is that it is possible to operate the both paths simultaneously from the point of view of the user, reducing the cost of implementation without significantly degrading the audio quality.

FIG. 1 is a block diagram of a communication system 10. The communication system 10 comprises an audio receiver path 12 and a digital transceiver path 14, wherein both paths 12, 14 are integrated on a single integrated circuit. As is apparent in FIG. 1, the audio receiver path 12 comprises a concealment means 16. The communication system 10 also comprises at least one functional block 18 connected to and shared by the both paths 12, 14. As is apparent in FIG. 1, the communication system 10 also comprises a digital controller means 20 connected to the both paths 12, 14, the at least one functional block 18, and the concealment means 16. The digital controller means 20 is operable to schedule the operation of the digital transceiver path 14, and to inform the concealment means 16 of start and end points of the activity of the digital transceiver path 14. The concealment means 16 is operable to mask interruptions in the audio stream from the audio receiver path 12 caused during periods of activity of the digital transceiver path 14. As is apparent in FIG. 1, the digital transceiver path 14 comprises a digital receiver path 14a, and a digital transmitter path 14b.

In a preferred embodiment of the communication system 10, the digital controller means 20 also is operable to control the operation mode of the at least one functional block 18 in dependence of which of the both paths 12, 14 is active.

In a preferred embodiment of the communication system 10, the concealment means 16 masks the interruptions in the audio stream by storing previously received audio data, and to create an estimate of a missing section of the audio stream during the interruptions by using the stored audio data.

Figure 2:
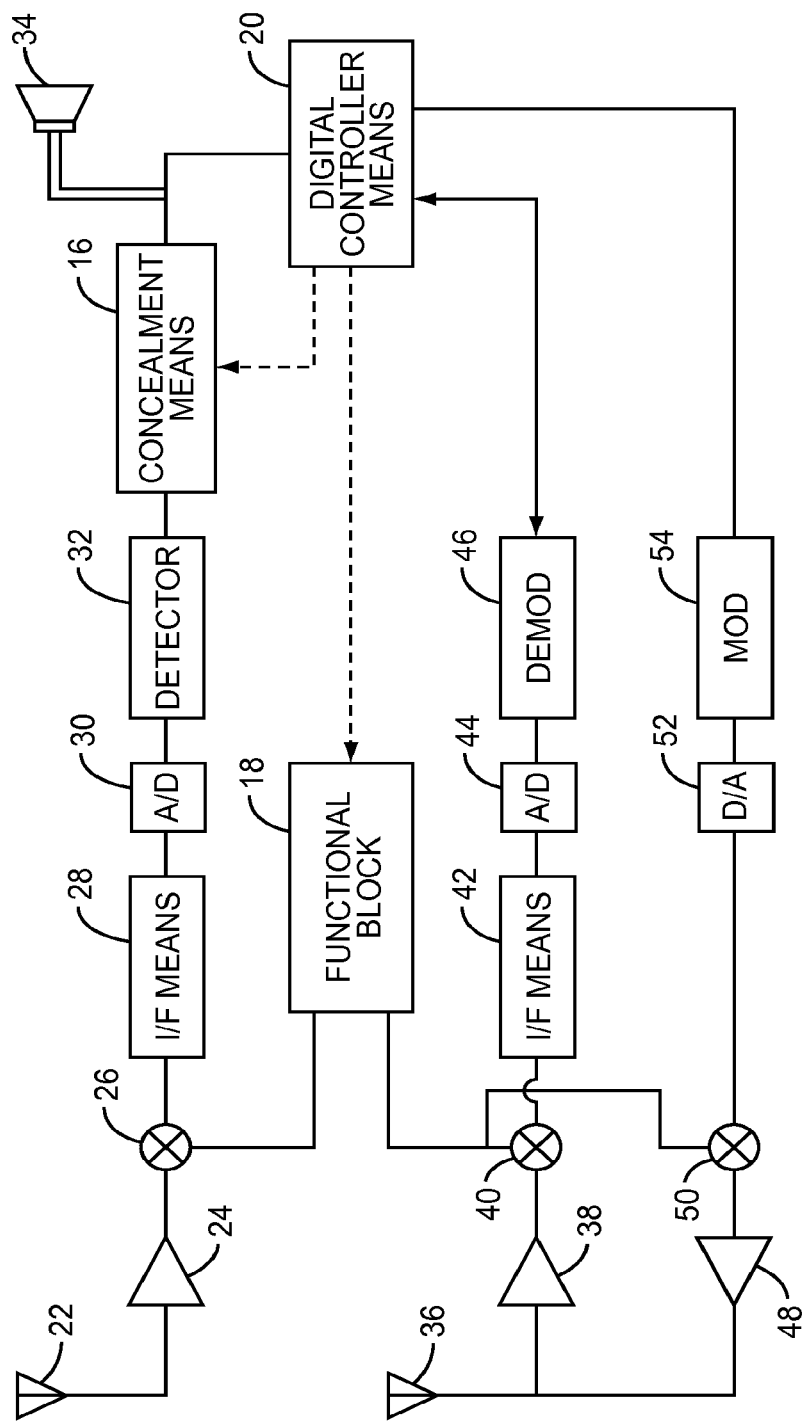
FIG. 2 is a block diagram in more detail of the communication system disclosed in FIG. 1.

FIG. 2 is a block diagram in more detail of the communication system 10 disclosed in FIG. 1. In this typical embodiment, the audio receiver path 12 is an FM audio receiver path 12, and the digital transceiver path 14 is a transceiver path 14 using low power, such as Bluetooth®, and comprises a digital receiver path 14a, and a digital transmitter path 14b. As is apparent in FIG. 2, the FM audio receiver path 12 comprises an antenna means 22, a to the antenna means 22 connected low noise amplifier means 24 operable to amplify the signal from the antenna means 22. The FM audio receiver path 12 also comprises a mixer means 26 connected to the low noise amplifier means 24 and to the shared functional block 18, which in this embodiment is a voltage controlled oscillator means 18, which is operable to generate a local oscillator frequency. Connected to the mixer means 26 is also an intermediate frequency means 28. The FM audio receiver path 12 also comprises a analog-digital converter means 30 connected to the intermediate frequency means 28 and a detector means 32 connected to the analog-digital converter means 30. As is apparent in FIG. 2, a concealment means is connected to the detector means 32, and is operable to mask interruptions in the audio stream from the FM audio receiver path 12 caused during periods of activity of the digital transceiver path 14. The concealment means 16 is in turn connected to a loudspeaker means 34.

The digital receiver path 14a (see FIG. 1) comprises an antenna means 36, and a low noise amplifier means 38 connected to the antenna means 36. The digital receiver path 14a also comprises a first mixer means 40 connected to the low noise amplifier means 38 and to the voltage controlled oscillator means 18. The first mixer means 40 is also connected to an intermediate frequency means 42, which in turn is connected to a analog-digital converter means 44. The digital receiver path 14a also comprises a to the analog-digital converter means 44 connected demodulator means 46, which in turn is connected to a digital controller means 20. The digital controller means 20 is also connected to the voltage controlled oscillator means 18 and to the concealment means 16, and is operable to schedule the operation of the digital transceiver means 14, and to inform the concealment means 16 of start and end points of the activity of the digital transceiver path 14.

The digital transmitter path 14b (see FIG. 1) comprises a power amplifier means 48 connected to the antenna mean 36, and a to the power amplifier means 48 connected second mixer means 50, which in turn also is connected to the voltage controlled oscillator means 18. The second mixer means 50 is also connected to an digital-analog converter means 52. Finally, the digital transmitter path 14b also comprises a to the digital-analog converter means 52 connected modulator means 54, which in turn is connected to the digital controller means 20.

In the embodiment disclosed in FIG. 2, the block shared between the two paths 12, 14 (see FIG. 1) is the voltage controlled oscillator means 18 (VCO), which generates the local oscillator frequency and thereby selects which channel that will be received. The digital controller means 20 is enabled to configure the voltage controlled oscillator means 18 to the correct local oscillator frequency for Bluetooth® or FM reception respectively. The digital controller means 20 is responsible for scheduling the operation of the Bluetooth® transceiver 14. It makes use of this knowledge to inform the concealment means 16 of the start and end points of gaps in the audio data stream caused by Bluetooth® activity. The concealment means 16 fills these gaps so as to prevent the user from being aware of them to as great an extent as possible. The audio stream, with filled-in gaps, is either routed directly to a loudspeaker means 34 or is routed via Bluetooth®, possibly in a compressed form, to a suitable headset.

In relation to FIG. 2, an embodiment is described in the context of a Bluetooth® data transceiver. However, the technique is equally applicable to any other digital communication standard that has a sufficiently low duty cycle in its activity.

Figure 3:
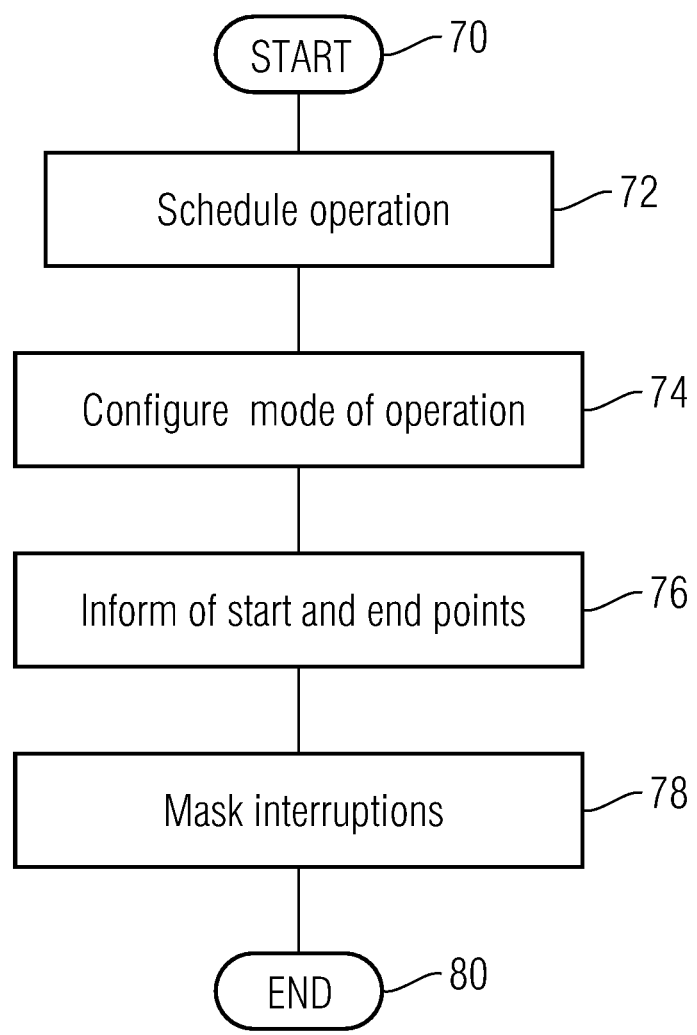
FIG. 3 is a flow chart of a method of sharing at least one functional block in a communication system.

In FIG. 3 there is disclosed a flow-chart of a method of sharing at least one functional block in a communication system. The communication system 10 comprises an audio receiver path 12 (see FIG. 1), and a digital transceiver path 14, wherein both paths 12, 14 are integrated on a single integrated circuit. The at least one functional block 18 is/are connected to and shared by the both paths 12, 14. The method begins at block 70. The method continues, at block 72, with the step: with the aid of a digital controller means 20, to schedule the operation of the digital transceiver path 14. Thereafter, at block 74, the method continues with the step: with the aid of the digital controller means 20, to configure the at least one functional block 18 to an appropriate mode of operation. The method continues at block 76, with the step: with the aid of the digital controller means 20, to inform a concealment function 16 comprised in the audio receiver path 12 of start and end points of the activity of the digital transceiver path 14. Thereafter, at block 78, the method continues with the step: with the aid of the concealment function 16, to mask interruptions in the audio stream from the audio receiver path 12 caused during periods of activity of the digital transceiver path 14. The method is completed at block 80.

In a preferred embodiment, the method also comprises the steps:
with the aid of the concealment function 16, to store previously received audio data; and
to create an estimate of a missing section of the audio stream during the interruptions by using the stored audio data.

In a preferred embodiment of the method, the concealment function 16 makes use of compressed audio data.

In another preferred embodiment of the method, the audio receiver path 12 is an FM audio receiver path 12.

In another preferred embodiment of the method, the digital transceiver path 14 is a digital transceiver path 14 using low power, and comprises a digital receiver path 14a, and a digital transmitter path 14b (see FIG. 1).

In another preferred embodiment of the method, the at least one functional block 18 is a voltage controlled oscillator means 18, and the method also comprises the step: to generate a local oscillator frequency.

In FIG. 4 there is disclosed a schematic diagram of some computer program products. There is disclosed n different digital computers $100_1, \ldots, 100_n$, wherein n is an integer. There is also disclosed n different computer program products $102_1, \ldots, 102_n$, here showed in the form of compact discs. The different computer program products $102_1, \ldots, 102_n$ are directly loadable into the internal memory of the n different digital computers $100_1, \ldots, 100_n$. Each computer program product $102_1, \ldots, 102_n$ comprises software code portions for performing some or all of the steps of FIG. 3 when the product(s) $102_1, \ldots, 102_n$ is/are run on the computer(s) $100_1, \ldots, 100_n$. The computer program products $102_1, \ldots, 102_n$ can e.g. be in the form of floppy discs, RAM discs, magnetic tapes, opto magnetic discs or any other suitable products.

The invention is not limited to the embodiments described in the foregoing. It will be obvious that many different modifications are possible within the scope of the following claims.

What is claimed is:

1. A method of sharing at least one functional block in a communication system comprising an audio receiver path and a digital transceiver path, wherein both paths are integrated on a single integrated circuit, wherein said at least one functional block is/are connected to and shared by said both paths, wherein said method comprises:
scheduling the operation of said digital transceiver path;
configuring said at least one functional block to appropriate mode of operation;
informing a concealment function comprised in said audio receiver path of start and end points of the activity of said digital transceiver path; and
masking interruptions in the audio stream from said audio receiver path caused during periods of activity of said digital transceiver path the masking act aided by the concealment function.

2. A method of sharing at least one functional block according to claim 1, wherein said method also comprises the steps:
storing previously received audio data; and
creating an estimate of a missing section of said audio stream during said interruptions by using said stored audio data.

3. A method of sharing at least one functional block according to claim 2, wherein said concealment function makes use of compressed audio data.

4. A method of sharing at least one functional block according to claim 1, wherein said audio receiver path is an FM audio receiver path.

5. A method of sharing at least one functional block according to claim 1, wherein said digital transceiver path is a transceiver path using low power, and comprises a digital receiver path, and a digital transmitter path.

6. A method of sharing at least one functional block according to claim 1, wherein said at least one functional block is a voltage controlled oscillator means and the method also comprises:
generating a local oscillator frequency.

7. A computer program product stored on non-transitory medium of at least one digital computer, comprising software code portions, when executed on said digital computer perform:
scheduling the operation of a digital transceiver path;
configuring at least one functional block to an appropriate mode of operation;
informing a concealment function comprised in an audio receiver path of start and end points of the activity of said digital transceiver path; and
masking interruptions in an audio stream from said audio receiver path caused during periods of activity of said digital transceiver path the masking act aided by the concealment function.

8. A computer program product according to claim 7, further comprising:
storing previously received audio data; and
creating an estimate of a missing section of said audio stream during said interruptions by using said stored audio data.

9. A computer program product according to claim 7, wherein said concealment function makes use of compressed audio data.

10. A computer program product according to claim 7, wherein said audio receiver path is an FM audio receiver path.

11. A computer program product according to claim 7, wherein said digital transceiver path is a transceiver path using low power, and comprises a digital receiver path, and a digital transmitter path.

\* \* \* \* \*